United States Patent [19]

Mashita et al.

[11] 4,352,915

[45] Oct. 5, 1982

[54] PROCESS FOR THE POLYMERIZATION OF ETHYLENE

[75] Inventors: Kentaro Mashita; Katsumi Hanji, both of Ibaraki, Japan

[73] Assignee: Sumitomo Chemical Company, Limited, Osaka, Japan

[21] Appl. No.: 152,610

[22] Filed: May 23, 1980

[30] Foreign Application Priority Data

Jun. 7, 1979 [JP] Japan .................................. 54-71872

[51] Int. Cl.$^3$ ............................................... C08F 4/64
[52] U.S. Cl. ....................................... 526/65; 526/116; 526/127; 526/128; 526/151; 526/158
[58] Field of Search ................ 526/65, 127, 128, 151, 526/158, 905, 116; 525/247, 53

[56] References Cited

U.S. PATENT DOCUMENTS

| | | | |
|---|---|---|---|
| 3,392,213 | 7/1968 | Berger | 526/65 |
| 3,592,880 | 7/1971 | Diedrich | 260/878 |
| 4,004,071 | 1/1977 | Aishima | 526/116 |
| 4,223,117 | 9/1980 | Sano et al. | 526/128 |

FOREIGN PATENT DOCUMENTS

| | | |
|---|---|---|
| 2104024 | 8/1971 | Fed. Rep. of Germany . |
| 2826548 | 4/1979 | Fed. Rep. of Germany ........ 526/65 |
| 46-46639 | 8/1971 | Japan . |
| 51-47079 | of 1976 | Japan . |
| 52-74686 | of 1977 | Japan . |
| 1057728 | 2/1967 | United Kingdom . |
| 1233599 | 5/1971 | United Kingdom . |
| 2020672 | 11/1979 | United Kingdom . |

*Primary Examiner*—Paul R. Michl
*Attorney, Agent, or Firm*—Stevens, Davis, Miller & Mosher

[57] ABSTRACT

In a slurry polymerization for producing an ethylene homopolymer or ethylene-α-olefin copolymer in multiple stages, in which the gas phase hydrogen concentration in each stage is different, using a catalyst system comprising a transition metal compound component and an organoaluminum compound component, the improvement which comprises conducting the polymerization by the use of a solid catalyst component comprising a titanium compound and/or vanadium compound supported on a specified magnesium compound, as the transition metal compound component, in a molar ratio of gas phase hydrogen to ethylene of 0.5 to 15 in the first stage thereby obtaining 30 to 95% by weight, of the total polymer, and in the second stage in a molar ratio of gas phase hydrogen to ethylene, not exceeding 0.2. By this process, it is possible to produce polyethylene having high melt flow and good homogeneity to give molded articles having fewer fish-eyes and less unevenness.

9 Claims, No Drawings

PROCESS FOR THE POLYMERIZATION OF ETHYLENE

The present invention relates to a process for producing ethylene homopolymers or ethylene-α-olefin copolymers, referred to as "ethylene polymer" hereinafter, having a good melt fluidity and good homogeneity to give molded articles having fewer fish-eyes and less unevenness.

For many applications to extrusion or blow molding into articles such as films, pipes, bottles, cables, etc., high molecular weight (low melt index) ethylene polymers of broad molecular weight distribution are required, because a high molecular weight ethylene polymers of a narrow molecular weight distribution is insufficient in melt fluidity and consequently has drawbacks such as higher power consumption in extrusion molding and formation of melt fracture on the surface of articles, resulting in defective appearance and poor commercial value.

Various methods to widen the molecular weight distribution of a polymer are known.

Attempts have been made to produce ethylene polymers having wide molecular weight distribution by selecting suitable catalysts, but the extent of widening the molecular weight distribution by making the active sites of catalysts nonuniform is small, or when the molecular weight distribution is much widened, the catalyst activity is lowered, resulting in losing the feature of high catalyst activity. That is, the use of the low catalyst activity requires removal of the catalyst residues by washing which makes the production uneconomical.

British Pat. No. 1,057,228 has disclosed a continuous slurry polymerization of ethylene using a Ziegler catalyst system in two polymerization zones. In this process, the ethylene polymer formed in the first zone is introduced into the second zone together with the catalyst, in which ethylene is further polymerized with the catalyst from the first zone. In this case, the catalyst activity is low and the catalyst residues must be removed by washing. In Japanese Patent Application Kokai (Laid-open) No. 639/1971, there is disclosed a two stage polymerization process using a catalyst system consisting of an organometallic compound and a transition metal compound reduced by an organo-magnesium compound.

According to this process, the catalyst activity is considerably improved but the process is still insufficient in that the amount of the residual transition metal in the polymer is as much as more than 10 ppm.

In both cases of two stage polymerization processes disclosed in British Pat. No. 1,233,599 and U.S. Pat. No. 3,592,880, the catalyst activities per the transition metal used are low, because the catalysts are of the nonsupported type.

Moreover, a number of studies have been made on supported type catalysts comprising transition metal compounds supported on carriers, and it has been found that inorganic compounds such as oxides, hydroxides, chlorides, and carbonates of metals or silicon, mixtures thereof, double salts thereof, etc. are effective as the carrier. There have been used, for example, magnesium oxide, titanium oxide, silica-alumina, magnesium carbonate, hydroxychlorides of divalent metals, magnesium hydroxide, magnesium chloride, double oxide of magnesium with aluminum, double oxide of magnesium with calcium, etc. Solids prepared by treatment of solid divalent metal compounds with an organoaluminum or an organomagnesium compound have been also used.

However, the catalyst activity is required, in the production of polyolefins, to be as high as possible, and in this respect, these catalysts are still insufficient in industrial use. Furthermore, there are sought highly active catalysts which give polymers producing less deposit on the inner wall of reactors in slurry polymerization, uniform particle size and high bulk density, and which cause advantages in the process and productivity.

Japanese Patent Application Kokai (Laid-open) No. 47,079/1976 has disclosed a multi-stage solution polymerization process in a hydrocarbon solvent at an elevated temperature such as 160° C. in the presence of a catalyst consisting of a transition metal compound supported on a solid carrier and an organometallic compound, but in the case of solution polymerization, the polymer concentration can be raised at most to only 20% by weight because of an increased viscosity of the polymerization system, thus resulting in a low production capacity per unit volume of the reactor.

Japanese Patent Application Kokai (Laid-open) Nos. 7,488/1979 and 32,588/1979 have disclosed a process for producing polyethylene in multi-stage polymerization bt the use of solid-carrier-supported Ziegler type catalyst with a high activity. Supported Ziegler-type catalysts, in general, show a comparatively large decrease of activity with the lapse of time and tend to lower the rate of polymerization when the hydrogen/ethylene concentration ratio is raised. For this reason, when the above-method, wherein in the first stage a higher molecular weight portion is produced at a low hydrogen concentration and in the second stage a lower molecular weight portion is produced at a high hydrogen concentration, is applied, there exists a difficulty in heat removal owing to extremely fast polymerization in the first stage, since the polymerization proceeds under condition of a low hydrogen/ethylene concentration ratio within a time when the catalyst activity is exceedingly high. In the second stage, because the polymerization proceeds under conditions relatively low in catalyst activity after a considerable time has passed and high in the hydrogen/ethylene concentration ratio, the more the polymerization rate is reduced and hence too much time is required as compared with the first stage. In other words, on account of a great difference in polymerization rate between the first and second stages, it is difficult to operate the overall polymerization process smoothly.

Moreover, when a higher molecular weight portion is produced in the first stage, though the cause is not clear, a part of the catalyst is deactivated in the course of polymerization of the first stage, or in the second stage, a part of active sites of the catalyst, which have grown in the first stage, stop growing on raising the hydrogen concentration. This results in the existence in the ultimate polymer of polymer particles which contain nothing of or a little of a lower molecular weight portion that must be produced in the second stage, causing undesirably fish-eyes and unevenness in the molded articles.

As another method of broadening the molecular weight distribution, there is a method of mechanical mixing of a low molecular weight ethylene polymer and a high molecular weight one. However, such a mechanical mixture has a problem in the homogeneity thereof, and apparently shows defects in the production of products such as films, pipes, bottles, and the like. Hence, it can not be acceptable.

On the other hand, a catalyst system comprising a solid catalyst component and an organoaluminum compound component has an extremely high activity, said solid catalyst component being a titanium compound or vanadium compound supported on a solid product obtained by the reaction of an organomagnesium compound with a aluminum halide and/or silicon halide. However, this catalyst system, in contrast to its markedly high activity, has a drawback of giving ethylene polymers with a narrow molecular weight distribution.

The present inventors solved the above-mentioned problem, and have achieved the present invention by utilizing the high activity of this catalyst system and in addition, by using a multi-stage polymerization process as a procedure to control the molecular weight distribution over a wide range as well as arbitrarily, that is to say, by a multi-stage process comprising producing a lower molecular weight polyethylene in the first stage and producing a higher molecular weight polyethylene in the second stage.

An object of the present invention is to provide a process for producing an ethylene homopolymer or ethylene-α-olefin copolymer, which has good processability and good homogeneity to give molded articles having fewer fish-eyes and less unevenness.

Other objects and advantages of the present invention will become apparent from the following description.

According to the present invention, in slurry polymerization of ethylene or in slurry copolymerization of ethylene with α-olefin in multiple stages, in which the gas phase hydrogen concentration is different in each stage, using a catalyst system comprising a transition metal compound component and an organoaluminum compound component, there is provided a process for producing ethylene homopolymers or ethylene-α-olefin copolymers, which comprises conducting polymerization in a molar ratio, of gas phase hydrogen to ethylene, of 0.5 to 15 by the use of a solid catalyst component comprising a titanium compound and/or vanadium compound supported on a magnesium compound as the transition metal compound component, in the first stage thereby polymerizing 30 to 95% by weight of the total polymerization amount and in the second stage in a molar ratio, of gas phase hydrogen to ethylene, not exceeding 0.2.

According to the present invention process, in which a lower molecular weight portion is produced in the first stage, it is possible to have the reaction proceed in the first stage, because in the early stage extremely high activity of the catalyst is depressed to a suitable degree by hydrogen since the polymerization is conducted under a high concentration of hydrogen in this stage; and in the second stage where the catalyst activity is comparatively low, the polymerization rate is maintained rather higher than that of the first stage, since the polymerization is conducted under a low hydrogen concentration, whereby it is possible to carry out the polymerization smoothly throughout the whole process, while allowing the catalyst to fully exhibit the activity thereof.

In addition, according to this invention, it is possible to obtain a polymer which gives molded articles having fewer fish-eyes and less unevenness. The reason for above is presumed as follows: Since a lower molecular weight portion is produced in the first stage, for example, even if a part of the catalyst is deactivated, this would not be a cause of fish-eyes and unevenness; and since the hydrogen concentration in the second stage is lower, less termination of the propagation will occur, and even if it happens, it would not be a cause of fish-eyes and unevenness because the polymer particles contain a lower molecular weight portion in large amounts.

This invention is described in detail below.

The catalyst system used in this invention comprises a combination of a solid catalyst component and an organoaluminum compound component, said solid catalyst component being a titanium compound and/or vanadium compound supported on a solid product obtained by the reaction of an organomagnesium compound, a halogenated aluminum compound represented by the general formula $$R'_n AlX_{3-n}$$

(where R' is an alkyl, cycloalkyl, aryl, aralkyl, or alkenyl group having up to 20 carbon atoms, X is a halogen atom, and n is a number defined by $0 \leq n < 3$) and/or a halogenated silicon compound represented by the general formula $$R^2_m SiX_{4-m}$$

(where $R^2$ is an alkyl, cycloalkyl, aryl, aralkyl, or alkenyl group having up to 20 carbon atoms, X is a halogen atom, and m is a number defined by $0 \leq m < 4$).

Among such catalyst systems, the system which has been disclosed in Japanese Patent Application Kokai (Laid-open) No. 74,686/1977 is most preferable.

According to the present invention, by use of the catalyst system described above, the amount of the transition metals remaining in the polymer, produced in a multi-stage polymerization can be reduced to less than about 10 ppm, usually less than about 5 ppm. Consequently, the catalyst residues removal process can be omitted without any diminishing of the quality of the polymer.

As the organomagnesium compound used in the catalyst preparation, there can be used, in general, any type of organomagnesium compounds formed by the reaction of an organic halide with metallic magnesium.

The suitable organomagnesium compounds are the Grignard compounds represented by the general formula $$R^3 MgX$$

(where $R^3$ is an alkyl, aryl, aralkyl, or alkenyl group having up to 20 carbon atoms and X is a halogen atom) and organomagnesium compounds represented by the general formula $$R^3_2 Mg$$

(where $R^3$ is as defined above).

That is to say, the above organomagnesium compounds, regardless whether or not they have been prepared in the presence of an ether, include any compounds existing in the equilibrium states represented by the equation $$2R^3 MgX \rightleftharpoons R^3_2 Mg + MgX_2 \rightleftharpoons R^3_2 Mg \cdot MgX_2$$

[W. Shlenk et al., Ber., 62, 920 (1929); Ibid., 64, 739 (1931)].

In the above equation, $R^3$ represents an alkyl, aryl, aralkyl, or alkenyl group having up to 20 carbon atoms, such as, for example, methyl, ethyl, n-propyl, isopropyl, n-butyl, sec-butyl, tert-butyl, n-amyl, isoamyl, n-hexyl, n-octyl, 2-ethylhexyl, phenyl, benzyl, etc. As the Grignard compounds, there may be given for example ethylmagnesium chloride, ethylmagnesium bromide, n-propylmagnesium chloride, n-butylmagnesium chloride, tert-butylmagnesium chloride, n-amylmagnesium chloride, phenylmagnesium bromide, etc.

As organomagnesium compounds represented by the general formula $R^3{}_2Mg$, there may be given for example diethylmagnesium, dipropylmagnesium, dibutylmagnesium, diamylmagnesium, dihexylmagnesium, dioctylmagnesium, diphenylmagnesium, dibenzylmagnesium, etc.

These organomagnesium compounds are synthesized and used in the presence of an ether solvent (e.g. diethyl ether, di-n-propyl ether, diisopropyl ether, di-n-butyl ether, di-tert-butyl ether, di-sec-butyl ether, diisoamyl ether, di-n-amyl ether, tetrahydrofuran, dioxane, a hydrocarbon solvent (e.g. hexane, heptane, octane, cyclohexane, benzene, toluene, xylene), or a mixture thereof.

As the halogenated aluminum compound represented by the general formula $R'_n AlX_{3-n}$, those having the more halogen atoms give the better results and anhydrous aluminum chloride is most preferred. Also, as the halogenated silicon compound represented by the general formula $R^2{}_m SiX_{4-m}$, those having the more halogen atoms give the better results and silicon tetrachloride is most preferred. $R^1$ and $R^2$ are each an alkyl, cycloalkyl, aryl, aralkyl, or alkenyl group having up to 20 carbon atoms, and include for example, methyl, ethyl, n-propyl, isopropyl, n-butyl, sec-butyl, tert-butyl, n-amyl, isoamyl, n-hexyl, n-heptyl, n-octyl, vinyl, allyl, cyclopentyl, cyclohexyl, phenyl, benzyl, or the like. X is a halogen atom, such as chlorine, bromine, or iodine, and n and m are numbers defined by $0 \leq n < 3$ and $0 \leq m < 4$, respectively. Examples of these compounds include as halogenated aluminum compounds, anhydrous aluminum chloride, aluminum bromide, aluminum iodide, diethylaluminum chloride, ethylaluminum dichloride, ethylaluminum sesquichloride, dibutylaluminum chloride, butylaluminum dichloride, dihexylaluminum bromide, hexylaluminum dibromide, etc.; and as halogenated silicon compounds, silicon tetrachloride, silicon tetrabromide, methylsilyl trichloride, dimethylsilyl dichloride, trimethylsilyl chloride, ethylsilyl trichloride, diethylsilyl dichloride, triethylsilyl chloride, propylsilyl tribromide, dipropylsilyl dibromide, tripropylsilyl bromide, dibutylsilyl dichloride, tributylsilyl chloride, vinylsilyl trichloride, etc.

The reaction for preparation of the catalyst system is carried out under an atomosphere of an inert gas such as nitrogen, argon, or the like. The reaction of an organomagnesium compound with a halogenated aluminum compound and/or halogenated silicon compound is desirably carried out in a solvent at 0° to 200° C., particularly at 0° to 100° C.

The solvents used for this reaction include alyphatic hydrocarbons such as pentane, hexane, heptane, octane, etc.; aromatic hydrocarbons, such as benzene, toluene, xylene, etc.; alicyclic hydrocarbons such as cyclohexane, cyclopentane, etc.; ethers such as diethyl ether, di-n-butyl ether, di-sec-butyl ether, di-tert-butyl ether, di-n-amyl ether, diisoamyl ether, tetrahydrofuran, dioxane, etc.; and mixtures of hydrocarbons and ethers.

The reaction ratio of the organomagnesium compound to the halogenated aluminum compound and/or halogenated silicon compound is 0.1 to 10.0, preferably 0.5 to 2.0 in molar ratio, and the reaction products precipitate in the form of solid.

The solid reaction product thus obtained is isolated and used as a carrier. More particularly, the solid reaction product may be used as a carrier after filtering, further after washing with a purified hydrocarbon solvent, or further after drying. Subsequently, the carrier thus prepared is allowed to support a titanium compound and/or vanadium compound.

The titanium compounds and vanadium compounds to be supported on the carrier include titanium tetrachloride, titanium tetrabromide, titanium tetraiodide, titanium trichloride, alkoxytitanium halides represented by the general formula $Ti(OR^4)_{4-p}X_p$, vanadium tetrachloride, vanadium oxytrichloride, etc.

The titanium compounds represented by the general formula $Ti(OR^4)_{4-p}X_p$ (where $R^4$ is an alkyl, cycloalkyl, or phenyl group having up to 20 carbon atoms, X is a halogen atom, and p is a number defined by $0 \leq p < 4$) include, for example, tetraethoxytitanium, ethoxytitanium trichloride, diethoxytitanium dichloride, triethoxytitanium chloride, propoxytitanium trichloride, butoxytitanium trichloride, phenoxytitanium trichloride, ethoxytitanium tribromide, dipropoxytitanium dibromide, tributoxytitanium bromide, etc. Among these compounds titanium tetrachloride is most preferable in point of the polymerization activity and properties of the particles.

As a supporting method, well-known methods such as the impregnation method, the kneading method, and the like can be applied, particularly, a titanium compound and/or vanadium compound can be suitably supported by the method comprising contacting with a carrier mentioned above using no solvent or in a suitable inert solvent. The supporting reaction is preferably carried out at room temperature (about 20° C.) to 150° C. After completion of the reaction, the reaction product is filtered, thoroughly washed with a purified hydrocarbon solvent, and used as it is or after drying. The amount of the titanium compound and/or vanadium compound to be supported is 0.1 to 30% by weight, most preferably 0.5 to 15% by weight, in terms of the titanium and/or vanadium atom contained in the resulting solid catalyst component.

Examples of the organoaluminum compound component include trialkylaluminums such as triethylaluminum, tri-n-propylaluminum, tri-n-butylaluminum, triisobutylaluminum, tri-n-hexylaluminum, etc.; dialkylaluminum monohalides such as diethylaluminum monochloride, di-n-propylaluminum monochloride, di-n-butylaluminum monochloride, di-n-hexylaluminum monochloride, etc.; alkylaluminum dihalides such as ethylaluminum dichloride, n-propylaluminum dichloride, n-butylaluminum dichloride, n-hexylaluminum dichloride, etc.; and alkylaluminum sesquihalides such as ethylaluminum sesquichloride, n-propylaluminum sesquichloride, n-butylaluminum sesquichloride, n-hexylaluminum sesquichloride, etc. These organoaluminum compound can be used alone or in combination.

The catalyst system used in the present invention is very highly active so that the process can be operated with an extremely high catalyst efficiency. The content of transition metal retained in the polymer produced can easily be reduced to less than about 10 ppm., usually to less than about 5 ppm., and hence the catalyst removal process can be omitted without any trouble with respect to the product quality. In addition, this catalyst system can give a polymer having uniform particle size, and high bulk density with less adhesion to the inner wall of reactor. Usually, a stable operation is possible at a slurry concentration exceeding 30% by weight. The polymer produced has a sharp particle size distribution, fewer macroparticles, and less finely devided powder, and hence it is very advantageous for operation.

As regards the polymerization process, a desired amount of a polymer having a desired molecular weight (or intrinsic viscosity) is produced in each of the stages. In this case, the molecular weight and the amount of polymer produced in each of the stages can be decided properly, considering the desired physical properties of the molded articles as well as the requirements on the polymer-processing.

The first stage polymerization is conducted under a gas phase hydrogen to ethylene molar ratio ranging from 0.5 to 15, preferably from 1 to 10. The intrinsic viscosity of the polymer produced in the first stage is 0.25 to 1.5 dl/g (at 135° C. in tetralin) in the case of ethylene homopolymer. When the gas phase hydrogen to ethylene molar ratio is less than 0.5, the processability of the resulting polymer is unsatisfactory and when the ratio is more than 15, the polymerization activity is undesirably low. The amount of monomer to be polymerized in the first stage is 30 to 95%, preferably 40 to 85%, by weight of the amount in the whole process. When it is out of this range, the processability of the ultimate polymer and the physical properties of the molded articles are unsatisfactory.

The second stage polymerization is conducted under a gas phase hydrogen to ethylene molar ratio of not more than 0.2, preferably from 0.1 to 0.002. The intrinsic viscosity of the resulting polymer is 3 to 10 dl/g in the case of ethylene homopolymer. When the gas phase hydrogen to ethylene molar ratio is more than 0.2, the melt flow ability of the product is unsatisfactory.

According to the multi-stage polymerization process of the present invention, a lower molecular weight polymer and a higher molecular weight polymer in situ unite with each other into a homogeneous polymer, so that an ethylene polymer having a desired average molecular weight as well as excellent melt flow properties can be obtained.

In the present invention, it is of importance to produce a lower molecular weight portion of polymer under high hydrogen concentrations in the first stage.

According to the present invention, the polymerization can be carried out smoothly throughout the whole process.

Another purpose of conducting the polymerization under a high concentration of hydrogen in the first stage to produce a lower molecular weight portion is to prevent the formation of fish-eyes and unevenness in the molded articles.

According to the present process, it is possible to obtain homogeneous ethylene polymers which give fewer fish-eyes and less unevenness when processed into molded articles.

In the present process, it is unobjectionable to add the solid catalyst component to increase the amount thereof during the first stage polymerization. In the second stage the addition is unnecessary, but the addition should be limited within a range not to deteriorate the properties of the resulting polymer even when the catalyst is further added.

Furthermore, according to the process of the present invention, when the partial pressure of ethylene is kept constant, the first stage polymerization is operated under higher pressure than that of the second stage, so that the polymerization slurry can be transferred from the first stage to the second stage by the pressure difference and hence transferring means such as a slurry pump is not always required.

The present process can be performed either in a batch system or in a continuous system. In a batch system, for instance, using a single reactor a solvent is first placed into the reactor, then hydrogen, ethylene alone or a mixture of ethylene and an α-olefin, and a predetermined amount of a catalyst are introduced to conduct the first stage polymerization for a fixed time. After the first stage polymerization has been completed, the hydrogen concentration is set at a predetermined value and thereafter, ethylene alone or a mixture of ethylene with an α-olefin and if necessary, hydrogen are introduced into the reactor to conduct the second stage polymerization for a fixed time. In this case, the proportion of reaction time between the first and second stages depends on the proportion of polymer amounts to be produced between the two stages.

In a continuous system, the polymerization can be carried out, for example, using two reactors connected in series. First, the predetermined amounts of a catalyst, a solvent, hydrogen, and ethylene alone or a mixture of ethylene with an α-olefin are continuously fed into the first reactor to conduct the first stage polymerization. The reaction mixture retained for a fixed time is introduced into the second reactor, the hydrogen concentration is set at a fixed value, and the solvent and ethylene alone or a mixture of ethylene with the α-olefin and, if necessary, hydrogen are continuously fed to conduct the second stage polymerization. A pressure-reducing vessel may be provided between the first and second reactors to adjust the hydrogen concentration. Residence time in each stage depends on the amount ratio of the polymer formed in the first and second stages. As another embodiment, the first stage polymerization and/or the second stage polymerization can be conducted with two or more reactors connected in series.

The process of the present invention can be favorably applied to the homopolymerization of ethylene and copolymerization of ethylene and an α-olefin such as propylene, 1-butene, 1-pentene, 1-hexene, 1-octene, 4-methylpentene-1 or the like. The amount of α-olefin to be copolymerized is preferably up to 15 mole%, more preferably up to 10 mole%, most preferably up to 5 mole% in the polymer.

The polymerization temperature in this invention may be selected from any temperature between ordinary temperature (about 20° C.) and 120° C. Among them, the temperature range from 50° to 100° C. is particularly preferred. The polymerization pressure is atmospheric pressure to 100 kg/cm$^2$, preferably 5 to 50 kg/cm$^2$.

Inert solvents used as the polymerization medium include aliphatic hydrocarbons such as propane, butane, pentane, hexane, heptane, octane, etc.; alicyclic hydrocarbons such as cyclohexane, cycloheptane, etc.; and aromatic hydrocarbons such as benzene, toluene, xylene, etc. Among them, aliphatic hydrocarbons are particularly preferable. In the case of copolymerization of ethylene with an α-olefin, it is possible to apply copolymerization in a liquefied α-olefin of 3 to 8 carbon atoms, such as propylene, 1-butene, 1-pentene, etc.

When as a polymerization medium, a low-boiling point saturated hydrocarbon such as propane, butane, pentane, etc., or a low-boiling point α-olefin such as propylene, 1-butene, etc. is used, the resulting slurry has the merit that the polymer can be separated only by a simple process called "Flash", as compared with a slurry obtained by slurry polymerization employing a liquid saturated hydrocarbon of 6 or 7 carbon atoms. Moreover, the polymerization in such a low-boiling point saturated hydrocarbon or a low-boiling point α-olefin yields a polymer having a less liquid phase-soluble fraction and does not cause an increase in viscosity of the polymerization mixture or blocking or adhesion of the polymer cake, all due to formation of soluble low molecular weight fractions. Further, the particle properties of the polymer are also good, permitting improvement of the production capacity per unit volume. Accordingly, this type of polymerization is more preferred.

For the concentration of the solid catalyst component in the polymerization system, it is usually sufficient both in the first and second stages to use 0.001 to 0.1 mmol per liter of solvent in terms of a transition metal atom, titanium or vanadium. The amount of the organoaluminum compound component is not particularly limited, but it is usually 0.5 to 500 mole, preferably 2 to 100 mole per 1 mole of titanium or vanadium atom contained in the solid catalyst component.

There is no objection to addition of the organoaluminum compound component at the second stage.

For charging of the catalyst, it is convenient to use an inert solvent as a carrier. The inert solvent may include those used as the polymerization solvent medium described above.

According to the present process, the average molecular weight, the molecular weight distribution, and the density of the polymer can be varied as required, and this permits industrially advantageous production of ethylene polymers having characteristics as desired with respect to physical properties and processability.

The ethylene polymer thus produced has a wide molecular weight distribution, excellent processability, and good homogeneity and gives molded articles having fewer fish-eyes and less unevenness. Accordingly, this polymer is most suitable for extrusion and blow molding for films, pipes, bottles, cables, etc.

The present invention is further illustrated with the reference to following Examples, but not limited thereto.

Properties of the polymers in the Examples were determined by the following methods.

Density and bulk density were determined in accordance with JIS K-6760 and JIS K-6721, respectively.

Melt flow ratio (MFR) was adopted as a measure of the melt fluidity. In the test method for melt index (MI) in accordance with ASTM 1238-57T, MFR is represented by the ratio of the melt flow at a load of 21.60 kg to the melt flow at a load of 2.160 kg (MI):

$$MFR = \frac{\text{Melt flow at load of 21.60 kg}}{\text{Melt flow at load of 2.160 kg}}$$

EXAMPLE 1

(1) Synthesis of organomagnesium compound

In a four-necked, 500-ml flask equipped with a stirrer, a reflux condenser, and a dropping funnel was placed 16.0 g of metallic magnesium chip for the Grignard reagent. Air and moisture in the whole equipment was removed by thoroughly replacing with nitrogen. In the dropping funnel were placed 68 ml (0.65 mole) of n-butyl chloride and 300 ml of n-butyl ether, and about 30 ml of the mixed liquid was added dropwise to the magnesium in the flask to initiate reaction.

After the initiation of reaction, the addition was continued for 4 hours at 50° C. After completion of the addition, the reaction was continued at 60° C. for a further 1.5 hours. Thereafter, the reaction solution was cooled to room temperature (about 20° C.) and the unreacted magnesium was filtered off with a glass filter.

The resulting n-butylmagnesium chloride in the n-butyl ether was hydrolyzed with 1 N-sulfuric acid, and back-titrated with 1 N-sodium hydroxide to determine the concentration (using phenolphthalein as an indicator), which was found to be 1.96 mol/l.

(2) Synthesis of solid catalyst component

The inside of a four-necked, 300-ml flask equipped with a stirrer, a dropping funnel, and a thermometer was thoroughly replaced with nitrogen to remove the air and the moisture. In the flask was placed 130 ml of the n-butyl ether solution of n-butylmagnesium chloride (0.26 mole) synthesized in (1), and 30 ml (0.26 mole) of silicon tetrachloride was added dropwise from the dropping funnel at 50° C. over 2 hours. Thereafter, the reaction was continued at 60° C. an additional one hour. The resulting solid product was separated, washed with n-heptane, and dried under reduced pressure to give 31.5 g of a white solid. In a four-necked, 100-ml flask was placed 10 g of the white solid and soaked with 50 ml of titanium tetrachloride and then allowed to react at 100° C. for one hour with stirring.

After completion of the reaction, the resulting product was washed with n-heptane repeatedly until titanium tetrachloride in the washings was not detected, and dried under reduced pressure to give 7.9 g of a solid catalyst component. The resulting solid catalyst component supported 14 mg of titanium atom per 1 g of the solid catalyst.

(3) Polymerization

A 10-l stainless steel autoclave equipped with a stirrer was thoroughly purged with dry nitrogen, and then was fed with 5 l of n-heptane, 40 g of 1-butene, and 10 mmole of triethylaluminum.

After the temperature was raised to 70° C., hydrogen was added until the total pressure became 22 kg/cm² G, and then ethylene was added until the total pressure became 29 kg/cm² G. Polymerization was started by adding 98.2 mg of the solid catalyst component described above together with 20 ml of n-heptane. The molar ratio of gas phase hydrogen/ethylene at this time was 3.36.

Subsequently, while keeping the total pressure constant by feeding ethylene continuously, the first stage polymerization was conducted at 70° C. for 128 minutes.

After the first stage polymerization was completed the molar ratio of gas phase hydrogen/ethylene was adjusted to 0.078 and the total pressure to 7 kg/cm² G. While keeping the total pressure constant by feeding ethylene continuously, the second stage polymerization was conducted.

After 68 minutes from the start of second stage polymerization, the polymerization was terminated with isopropyl alcohol, and the unreacted ethylene was released. The amount ratio of the first stage ethylene feed/the second stage ethylene feed was 55/45. The polymer formed was filtered and dried under reduced pressure to obtain 1578 g of polymer. The catalyst efficiency was 50,100 g polymer g-Ti.hr.$C_2H_4$ atm. The polymer had the density of 0.949 g/cm$^3$, MI of 0.088 g/10 min., MFR of 130, and the bulk density of 0.30 g/cm$^3$.

When the polymer obtained was molded into an inflation film of 10 $\mu$-thickness, the polymer had a low extrusion load, good drawdown performance, and exceedingly high stability of bubble. The film had very few fish-eyes as 7/1000 cm$^2$, and was satisfactory in physical properties such as tensile strength, impact resistance, tear strength, etc., and good in hue.

COMPARATIVE EXAMPLE 1

The following shows a case of polymerization producing a high molecular weight portion at the first stage.

The inside of a 10-l stainless steel autoclave equipped with a stirrer was thoroughly replaced with dry nitrogen, and 5 l of n-heptane, 40 g of 1-butene, and 10 mmole of triethylaluminum were charged therein, and the temperature was raised to 70° C. Then, ethylene was fed to give a total pressure of 7 kg/cm$^2$ G, and then hydrogen was fed to give a molar ratio of gas phase hydrogen/ethylene of 0.069.

Polymerization was started by adding 113 mg of the solid catalyst component synthesized in Example 1 together with 20 ml of n-heptane. Subsequently, while keeping the total pressure constant by feeding ethylene, the first stage polymerization was conducted at 70° C. for 30 minutes. After completion of the first stage polymerization, the feeding of ethylene was stopped and hydrogen was fed until the total pressure became 29 kg/cm$^2$ G. The second stage polymerization was conducted while keeping the total pressure constant by feeding ethylene continuously. The molar ratio of gas phase hydrogen/ethylene in the second stage was 3.52. After 184 minutes from the start of second stage polymerization, the polymerization was terminated with isopropyl alcohol and the unreacted ethylene was released. The amount ratio of the first stage ethylene feed/the second stage ethylene fed was 45/55. The former polymer was filtered and dried under reduced pressure at 60° C. to obtain 1522 g of polymer. The catalyst efficiency was 35,400 g polymer/g-Ti.hr.$C_2H_4$ atm. The polymer had a density of 0.950 g/cm$^3$, MI of 0.11 g/10 min., MFR of 129, and a bulk density of 0.44 g/cm$^3$.

When the polymer obtained was molded into an inflation film of 10 $\mu$-thickness, the processability was good, but the film has fish-eyes of as many as 470/1000 cm$^2$, so that the film was poor in commercial value.

EXAMPLE 2

(1) Synthesis of solid catalyst component

The inside of a four-necked, 500-ml flask equipped with a stirrer, a dropping funnel, and a thermometer was thoroughly replaced with nitrogen to remove air and moisture. In the flask was placed 35 g (0.26 mole) of anhydrous aluminum chloride purified by sublimation, and it was dissolved in 150 ml of n-butyl ether while cooling with ice. To this solution, 130 ml of the n-butyl ether solution of n-butylmagnesium chloride (0.26 mole) synthesized in Example 1 as added dropwise from the dropping funnel at 50° C. over 2 hours to form a white precipitate. After the reaction was continued at 60° C. for an additional one hour, the resulting solid product was separated, washed, and dried under reduced pressure to give 46.5 g of a white solid. In the same manner as in Example 1, 10 g of this white solid was reacted with titanium tetrachloride to obtain 7.7 g of a solid catalyst component. This solid catalyst component supported 18 mg of titanium atom per g of the solid catalyst.

(2) Polymerization

Into a 10-l stainless steel autoclave equipped with a stirrer purged thoroughly with dry nitrogen were charged 5 l of n-heptane and 10 mmol of triethylaluminum. After the temperature was raised to 70° C., hydrogen was fed until the total pressure became 21 kg/cm$^2$ G, and subsequently, ethylene was fed until the total pressure became 28 kg/cm$^2$ G. Polymerization was started by adding 125 mg of the solid catalyst component synthesized in (1) of this Example, together with 20 ml of n-heptane. The molar ratio of gas phase $H_2/C_2H_4$ at this time was 3.59. Subsequently, while the total pressure was kept constant with continuous feeding of ethylene, the first stage polymerization was conducted at 70° C. for 140 minutes. After the first stage polymerization, the molar ratio of gas phase $H_2/C_2H_4$ was turned to 0.067, and the total pressure to 7 kg/cm$^2$. While keeping the total pressure constant by feeding ethylene continuously, the second stage polymerization was conducted. After 72 minutes from the start of second stage polymerization, the polymerization was terminated with isopropyl alcohol, and the unreacted ethylene was released. The amount ratio of the first stage ethylene feed/the second stage ethylene feed was 60/40. The polymer formed was filtered and dried under reduced pressure at 60° C. to obtain 1611 g of polymer. The catalyst efficiency was 29,000 g polymer/g-Ti/hr.$C_2H_4$ atm. The polymer had a density of 0.961 g/cm$^3$, MI of 0.064 g/10 min., MFR of 165, and a bulk density of 0.33 g/cm$^3$.

When the polymer obtained was molded into an inflation film of 10 $\mu$-thickness, the processability was good and the film had fish-eyes of as few as 9/1000 cm$^2$.

EXAMPLE 3

(1) Synthesis of organomagnesium compound

In a four-necked, 500-ml flask equipped with a stirrer, a reflux condenser, and a dropping funnel was placed 16.0 g of metallic magnesium chips for the Grignard reagent. Air and moisture in the equipment was removed by thoroughly replacing with nitrogen. In the dropping funnel were placed 57 ml (0.65 mol) of n-propyl chloride and 300 ml of diisoamyl ether, and about 30 ml of the mixture was added dropwise to the magnesium to initiate reaction.

After the initiation of the reaction, the addition was continued for 3 hours at 30° C. After the addition, the reaction was continued at 40° C. for an additional one hour. Thereafter, the reaction solution was cooled to a room temperature (about 20° C.) and the unreacted magnesium was filtered off with a glass filter. The concentration of n-propylmagnesium chloride in the diisoamyl ether was 2.10 mole/l.

(2) Synthesis of solid catalyst component

The inside of a four-necked, 300-ml flask equipped with a stirrer, a dropping funnel, and a thermometer was thoroughly replaced with nitrogen to remove the air and the moisture. In the flask was placed 124 ml of isoamyl ether solution of n-propylmagnesium chloride (0.26 mole) synthesized in (1) of this Example, and 30 ml (0.26 mole) of silicon tetrachloride was added thereto dropwise from the dropping funnel at 50° C. over 2 hours. Thereafter, the reaction was continued at 60° C. for an additional one hour. The resulting solid product was separated, washed with n-heptane, and dried under reduced pressure to give 30.7 g of a white solid. In a four-necked, 100-ml flask was placed 10 g of this white solid and soaked with 50 ml of ethoxytitanium trichloride and allowed to react at 100° C. for one hour with stirring. After completion of the reaction, the resulting product was washed with n-heptane repeatedly until ethoxytitanium trichloride in the washings became undetected, and dried under reduced pressure to obtain 8.2 g of a solid catalyst component. This solid catalyst component supported 16 mg of titanium atom per g of the solid catalyst component.

(3) Polymerization

The inside of a 10-l stainless steel autoclave equipped with a stirrer was thoroughly replaced with dry nitrogen, and then 2470 g of butane, 30 g of 1-butene, and 10 mmol of triethylaluminum were charged therein. After the temperature was raised to 60° C., hydrogen was fed until the total pressure became 24 kg/cm$^2$ G, and then ethylene was fed until the total pressure became 28 kg/cm$^2$ G. Polymerization was started by adding 162 mg of the solid catalyst component synthesized in (2) of this Example, together with 20 ml of n-heptane. The molar ratio of gas phase $H_2/C_2H_4$ at this time was 3.92. Subsequently, while keeping the total pressure constant by feeding ethylene continuously, the first stage polymerization was conducted at 60° C. for 83 minutes.

After the first stage polymerization, the molar ratio of gas phase $H_2/C_2H_4$ was adjusted to 0.064 and the total pressure to 12 kg/cm$^2$ G.

While keeping the total pressure constant by feeding ethylene continuously, the second stage polymerization was conducted.

After 68 minutes from the start of second stage polymerization, the polymerization was terminated with isopropyl alcohol, and the unreacted monomers and butane were released.

The amount ratio of the first stage ethylene feed/the second stage ethylene feed was 50/50. The polymer produced was dried at 60° C. under reduced pressure to obtain 1543 g of polymer. The catalyst efficiency in this case was 59,000 g polymer/g-Ti.hr.$C_2H_4$ atm. The polymer had a density of 0.951 g/cm$^3$, MI of 0.10 g/10 min., MFR of 112, and a bulk density of 0.32 g/cm$^3$.

When the resulting polymer was molded into an inflation film of 10μ-thickness, the processability was good and fish-eyes in the film were as extremely few as 5/1000 cm$^2$.

EXAMPLE 4

(1) Synthesis of solid catalyst component

A solid catalyst component was synthesized in the same manner as in Example 1, except that methylsilyl trichloride was used in place of silicon tetrachloride. This solid catalyst component supported 15 mg of titanium atom per g of the solid catalyst component.

(2) Polymerization

In a 10-l stainless steel autoclave equipped with a stirrer, the inner part of which had been thoroughly replaced with dry nitrogen, were charged 2120 g of butane, 380 g of 1-butene, and 10 mmol of triethylaluminum.

After the temperature was raised to 60° C., hydrogen was fed until the total pressure became 20 kg/cm$^2$ G, and then ethylene until the total pressure became 30 kg/cm$^2$ G. Polymerization was started by adding 21.7 mg of the solid catalyst component synthesized in (1) of this Example, together with 20 ml of n-heptane. The molar ratio of gas phase $H_2/C_2H_4$ at this time was 1.35. Subsequently, while keeping the total pressure constant by feeding ethylene continuously, the first stage polymerization was conducted at 60° C. for 139 minutes. After the first stage polymerization, the molar ratio of gas phase $H_2/C_2H_4$ was adjusted to 0.046 and the total pressure to 18 kg/cm$^2$ G.

While keeping the total pressure constant by feeding ethylene continuously, the second stage polymerization was conducted.

The second stage polymerization was terminated with isopropyl alcohol after 51 minutes from the start thereof, and the unreacted monomers and butane were released. The amount ratio of the first stage ethylene feed/the second stage ethylene feed was 70/30. The polymer produced was dried at 60° C. under reduced pressure to obtain 1521 g of polymer. The catalyst efficiency in this case was 118,000 g polymer/g-Ti.hr.$C_2H_4$ atm. The polymer had a density of 0.935 g/cm$^3$, MI of 0.43 g/10 min., MFR of 89, and a bulk density of 0.31 g/cm$^3$.

When the polymer was subjected to extrusion molding to form a pipe of 30 mm in diameter and 3 mm in wall thickness, drawdown was not observed and the resulting molded articles had a good appearance and satisfactory physical properties.

EXAMPLE 5

In a 10-l stainless steel autoclave equipped with a stirrer, the inner part of which had been thoroughly replaced with dry nitrogen, were charged 1750 g of butane, 750 g of 1-butene, and 10 mmole of triethylaluminum. After the temperature was raised to 60° C., hydrogen was fed until the total pressure became 16 kg/cm$^2$ G, and then ethylene until the total pressure became 26 kg/cm$^2$ G. Polymerization was started by adding 17.8 mg of the solid catalyst component synthesized in Example 4, together with 20 ml of n-heptane. The molar ratio of gas phase $H_2/C_2H_4$ at this time was 0.83. Subsequently, while keeping the total pressure constant by feeding ethylene continuously, the first stage polymerization was conducted at 60° C. for 136 minutes. After the first stage polymerization, the molar ratio of gas phase $H_2/C_2H_4$ was adjusted to 0.015 and the total pressure to 18 kg/cm$^2$ G. While keeping the total pressure constant by feeding ethylene continuously, the second stage polymerization was conducted. The second stage polymerization was terminated with isopropyl alcohol after 40 minutes from the start thereof, and the unreacted monomers and butane were released. The amount ratio of the first stage ethylene feed/the second stage ethylene feed was 80/20. The polymer produced was dried at 60° C. under reduced pressure to obtain 1550 g of polymer. The catalyst efficiency was 198,000 g polymer/g-Ti.hr.$C_2H_4$ atm. The polymer had a density of 0.923 g/cm$^3$, MI of 0.65 g/10 min., MFR of 78, and a bulk density of 0.31 g/cm$^3$.

When the polymer was subjected to extrusion molding to form a pipe of 30 mm in diameter and 3 mm in wall thickness, drawdown was not observed and the resulting molded articles had a good appearance and satisfactory physical properties.

EXAMPLE 6

In a 10-l stainless steel autoclave equipped with a stirrer, the inner part of which had been thoroughly replaced with dry nitrogen, were charged 5 l of n-heptane, 30 g of propylene, and 10 mmol of triisobutylaluminum.

After the temperature was raised to 70° C., hydrogen was fed until the total pressure became 26 kg/cm² G, and then ethylene until the total pressure became 31 kg/cm² G. Polymerization was started by adding 213 mg of the solid catalyst component synthesized in Example 1, together with 20 ml of n-heptane. The molar ratio of gas phase $H_2/C_2H_4$ at this time was 5.08. This first stage polymerization was continued for 105 minutes at 70° C. while keeping the total pressure constant by feeding ethylene continuously.

After the first stage polymerization, the molar ratio of gas phase $H_2/C_2H_4$ was adjusted to 0.045, and the total pressure to 6 kg/cm² G. With the continuous feeding of ethylene, the second stage polymerization was conducted. The polymerization was stopped with isopropyl alcohol after 42 minutes from the start of the second stage polymerization, and unreacted monomers were released. The amount ratio of the first stage ethylene feed/the second stage ethylene feed was 60/40. Filtration of the yielded polymer followed by drying at 60° C. under reduced pressure gave 1472 g of polymer. The catalyst efficiency in this case was 40,300 g polymer/g-Ti.hr.$C_2H_4$ atm. The polymer had a density of 0.945 g/cm³, MI of 0.055 g/10 min., MFR of 173, and a bulk density of 0.30 g/cm³.

When the resulting polymer was molded into an inflation film of 10μ-thickness, the processability was good, fish-eyes of the film were as extremely few as 6/1000 cm², and physical properties thereof were also satisfactory.

EXAMPLE 7

In a 10-l stainless steel autoclave equipped with a stirrer, the inner part of which had been thoroughly replaced with dry nitrogen, were charged 2460 g of butane, 40 g of propylene, and 10 mmole of triisobutylaluminum.

After the temperature was raised to 70° C., hydrogen was fed until the total pressure became 23.5 kg/cm² G, and then ethylene until the total pressure became 30.5 kg/cm² G. Polymerization was started by adding 62.8 mg of the solid catalyst component synthesized in Example 1, together with 20 ml of n-heptane. The molar ratio of gas phase $H_2/C_2H_4$ was 1.84. The first stage polymerization was continued for 124 minutes at 70° C. while keeping the total pressure constant by feeding ethylene continuously. After the first stage polymerization was completed, the molar ratio of gas phase $H_2/C_2H_4$ was adjusted to 0.052, and the total pressure to 17.5 kg/cm² G. With the continuous feeding of ethylene to keep the total pressure constant, the second stage polymerization was conducted. The polymerization was terminated with isopropyl alcohol after 51 minutes from the start of the second stage polymerization, and the unreacted monomers and butane were released. The amount ratio of the first stage ethylene feed/the second stage ethylene feed was 70/30. The polymer formed was dried under reduced pressure at 60° C. to obtain 1590 g of polymer. The catalyst efficiency in this case was 88,400 g polymer/g-Ti.hr.$C_2H_4$ atm. The polymer had a density of 0.948 g/cm³, MI of 0.21 g/10 min., MFR of 119, and a bulk density of 0.32 g/cm³.

When the polymer was subjected to blow molding to form 10-l bottles, drawdown was not observed and the formed products had satisfactory physical properties as well as a smooth skin.

EXAMPLE 8

Using two 50-l polymerization reactors connected in series, a continuous polymerization was carried out. The first reactor was continuously fed with n-heptane at 12.5 l/hr, triethylaluminum 25 mmole/hr, the solid catalyst component synthesized in Example 1 0.52 g/hr, ethylene 3.5 Nm³/hr and 1-butene 0.05 Nm³/hr. Polymerization was conducted at 70° C. under a total pressure of 29 kg/cm² G with the volume ratio of gas phase $H_2/C_2H_4$ maintained as 3.2. The polymer slurry (having a concentration of 330 g.polymer/l-n-heptane) formed in the first reactor was continuously introduced into the second reactor by means of pressure difference. The second reactor was continuously fed with n-heptane at a rate of 12.5 l/hr, ethylene 2.8 Nm³/hr, and 1-butene 0.05 Nm³/hr, and the polymerization was conducted at 70° C. under a total pressure of 7 kg/cm² G with the volume ratio of gas phase $H_2/C_2H_4$ maintained as 0.07. The polymer slurry (having a concentration of 300 g polymer/l-n-heptane) was continuously withdrawn from the second reactor to recover and dry the produced polymer. The amount of polymer was 7.5 kg/hr and the residual titanium content in the polymer was 0.96 ppm in terms of titanium atom. The polymer had a density of 0.953 g/cm³, MI of 0.070 g/10 min., MFR of 141, and a bulk density of 0.31 g/cm³.

When the resulting polymer was molded into an inflation film of 10μ-thickness, a low extrusion load, good drawdown performance, and extremely good stability of bubble were observed. Fish-eyes in the film were as few as 8/1000 cm², the film properties such as tensile strength, impact resistance, tear strength, etc. were satisfactory, and the film hue was also good.

What is claimed is:

1. In a slurry polymerization process for producing an ethylene homopolymer or ethylene-α-olefin copolymer in multiple stages, in which the gas phase hydrogen concentration in each stage is different, by the use of a catalyst system comprising a transition metal compound component and an organoaluminum compound component, the improvement which comprises conducting the polymerization in a molar ratio, of gas phase hydrogen to ethylene, of 0.5 to 15 in the first stage thereby polymerizing 30 to 95% by weight of the overall polymerization amount and in the second stage in a molar ratio, of gas phase hydrogen to ethylene, not exceeding 0.2, by using as the transition metal compound component a solid catalyst component comprising a titanium compound and/or vanadium compound supported on a solid carrier obtained by the reaction of an organomagnesium compound and a halogenated aluminum compound and/or halogenated silicon compound represented by the general formula

and/or the general formula

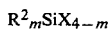

wherein R' and R² are each an alkyl, cycloalkyl, aralkyl, aryl, or alkenyl group having up to 20 carbon atoms, X is a halogen atom, and n and m are numbers defined by $0 \leq n < 3$ and $0 \leq m < 4$, respectively; wherein the molar ratio of said organomagnesium compound to said halogenated aluminum compound and/or halogenated silicon compound is within the range of 0.1/1 to 10/1; wherein the amount of said titanium compound and/or vanadium compound supported on said solid carrier is 0.1 to 30% by weight in terms of titanium and/or vanadium atom based on the total amount of the supported compound and the carrier; wherein said reaction of the organomagnesium compound with the halogenated aluminum compound and/or halogenated silicon compound is carried out at 0° to 100° C.; and, wherein said organomagnesium compound is represented by the general formulae $$R^3MgX \text{ and/or } R_2^3Mg$$

wherein $R^3$ is an alkyl, aralkyl, aryl, or alkenyl group having up to 20 carbon atoms.

2. A process according to claim 1, wherein said solid carrier is formed in the presence of an ether solvent.

3. A process according to claim 1, wherein said halogenated aluminum compound is anhydrous aluminum chloride.

4. A process according to claim 1, wherein said halogenated silicon compound is silicon tetrachloride.

5. A process according to claim 1, wherein the molar ratio of said organomagnesium compound to said halogenated aluminum compound and/or halogenated silicon compound is within the range of 0.5/1 to 2.0/1.

6. A process according to claim 1, wherein the amount of said titanium compound and/or vanadium compound supported on said solid carrier is 0.1 to 15% by weight in terms of titanium and/or vanadium atom based on the total amount of the supported compound and the carrier.

7. A process according to claim 1, wherein said polymerization amount in the first stage is 40 to 85% by weight of overall polymerization amount.

8. A process according to claim 1, wherein the molar ratio of gaseous phase hydrogen to ethylene in the first stage is 1 to 10.

9. A process according to claim 1, wherein the molar ratio of gaseous phase hydrogen to ethylene in the second stage is 0.1 to 0.002.

* * * * *